United States Patent Office 3,299,168
Patented Jan. 17, 1967

---

3,299,168
EPOXY RESIN COMPOSITIONS AND CURED PRODUCTS OBTAINED THEREFROM
George B. Payne, Berkeley, Calif., assignor to Shell Oil Company, New York, N.Y., a corporation of Delaware
No Drawing. Filed July 17, 1961, Ser. No. 124,393
8 Claims. (Cl. 260—830)

This invention relates to new epoxy resin compositions. More particularly, the invention relates to epoxy resin compositions having improved fluidity which can be cured to form products having improved physical properties.

Specifically, the invention provides new epoxy resin compositions having low viscosities and can be cured to form products having excellent resistance to deformation at high temperatures and excellent resistance to water. The new compositions comprising a mixture of (1) a polyether polyepoxide possessing more than one vicepoxy group, and preferably a glycidyl ether of a polyhydric phenol, and (2) an alpha,beta-vic-epoxy ester of an alpha,beta-vic-epoxy-carboxylic acid, and preferably glycidyl glycidate. The invention further provides valuable cured products obtained by reacting the aforementioned compositions with epoxy curing agents, such as, for example, polyamines, polycarboxylic acid and anhydrides and metal salts.

Polyepoxides, such as, for example, those obtained by reacting epichlorohydrin with polyhydric phenols in the presence of caustic, are promising materials for use in preparing industrial products as they may be cured to resins which are very hard and durable and have good resistance to chemicals. These resins, however, have certain undesirable characteristics which have placed a limitation on their industrial applications. These materials, for example, are generally thick liquids or solids and are difficult to utilize in that form for many applications, such as in the preparation of surfacing compositions, castings, impregnating and sealing compositions and the like. It has been proposed to correct this defect by combining the resins with fluid inert diluents, such as dibutyl phthalate, or reactive diluents, such as the monoepoxy compounds as butyl glycidyl ether. While this type of addition improves the fluidity, it has been found that the resulting cured products have lost many of the desired properties of the initial resin, such as high heat distortion temperatures, good water resistance and fast rate of cure.

It is, therefore, an object of the invention to provide new epoxy resin compositions. It is a further objective to provide new epoxy resin compositions which have improved fluidity. It is a further object to provide new epoxy resin compositions having viscosities of the order of 5 to 15 poises at 25° C. It is a further object to provide new epoxy resin compositions that can be cured to form products having excellent resistance to deformation at high temperatures. It is a further object to provide new compositions that can be cured to form products having good resistance to water. It is a further object to provide new epoxy resin compositions that can be cured in a very short period. It is a further object to provide cured epoxy resins having improved physical properties. Other objects and advantages of the invention will be apparent from the following detailed description thereof.

It has now been discovered that these and other objects can be accomplished by the compositions of the invention comprising a mixture of (1) a polyether polyepoxide possessing more that one vic-epoxy group, and preferably a glycidyl polyether of a polyhydric phenol, and (2) an alpha,beta-vic-epoxy ester of an alpha,beta-vic-epoxycarboxylic acid, and preferably glycidyl glycidate, the said epoxy ester being present in an amount of at least 1 part per 100 parts of the polyether polyepoxide. It has been found that these new compositions have surprisingly low viscosities, such as, for example, the order of 5 to 15 poises at 25° C., and can be easily poured and otherwise handled as fluid liquids. In addition, the new compositions cure readily when contacted with conventional epoxy resin curing agents to form hard insoluble infusible products having surprisingly good physical properties. The new cured products, for example, have excellent heat distortion points and improved water resistance. Evidence of these superior properties may be found in the working examples at the end of the specification.

One of the components in the new compositions of the invention comprise the alpha,beta-vic-epoxy esters of vic-epoxy carboxylic acids. By vic-epoxy is meant the oxirane ring

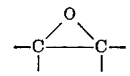

wherein the oxygen atom is connected to each of two adjacent carbon atoms in a chain. Typical alpha,beta-vic-epoxy esters of alpha,beta-vic-epoxy carboxylic acids are the alpha,beta-vic-epoxyalkyl alpha,beta-vic-epoxyalkyl alkanoates. These compounds may be represented by the structural formula

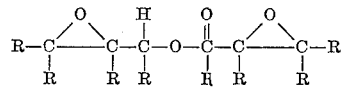

wherein each R is selected from the group consisting of hydrogen and alkyl radicals, preferably having no more than six carbon atoms. Particularly preferred are esters wherein the ester moiety and the acid moiety each have from three to eight carbon atoms.

Representative of such esters are 2,3-epoxybutyl 2,3-epoxybutyrate; 2,3-epoxyamyl 2,3-epoxyvalerate; 2,3-epoxyhexyl 2,3-epoxycaproate; 2,3-epoxyheptyl 2,3-epoxyheptanoate; and 2,3-epoxyoctyl 2,3-epoxycaprylate, as well as 2,3-epoxyisobutyl 2,3-epoxyisobutyrate. Other esters include 3,4-epoxybutyl 3,4-epoxybutyrate; 3,4-epoxypentyl 3,4 - epoxyvalerate; 3,4 - epoxytetrahydropyranyl-3 3,4-epoxytetrahydropyrane-3 - carboxylate 4,5-epoxypentyl 4,5-epoxyvalerate; 5,6-epoxyhexyl 5,6-epoxycaproate, and the like. Most preferred ester of the esters of the invention, because of its terminal epoxy group, is glycidyl glycidate.

The above-described esters are preferably prepared by reacting a vic-epoxyaldehyde in liquid phase in an inert organic solvent in the presence of a catalytic amount of a compound selected from alkali metal hydrides, aluminum alkoxides, and Grignard reagents. By vic-epoxyaldehyde is meant a compound having an oxirane or

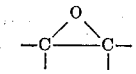

group. Preferred aldehyde compounds are those made up of carbon, hydrogen and oxygen, and having the epoxy group and the formyl group as the sole functional groups. Exemplary aldehydes are the epoxyalkanals wherein the epoxy group is disposed on the alkane chain, and the alkane chain has up to 8 carbon atoms, e.g., 3,4-diepoxybutanal; 3,4-epoxypentanal; 4,5-epoxypentanal; 5,6-epoxyhexanal; 3,4-epoxyhexanal; and 7,8-epoxyoctanal. These epoxyalkenals have in general the structure

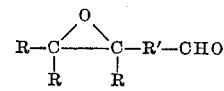

where each R has the above meaning and R' is alkylene or alkylidene, e.g., methylene, propylidene, or the like.

Most preferred class of such epoxyaldehydes are the alpha, beta-vic-epoxyalkanals having the structural formula

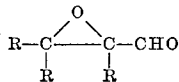

where R is selected from the group consisting of alkyl, preferably of up to six carbon atoms, and the hydrogen atom. Typical compounds of this type are 2,3-epoxybutyraldehyde; 2,3-epoxyisobutyraldehyde; 2,3-epoxyvaleraldehyde; 2,3-epoxycaproaldehyde and 2,3-epoxyheptaldehyde. Also operative are the 2,3-epoxycycloalkyl aldehydes, particularly 2,3-epoxycyclopentanal and 2,3-epoxycyclohexanal.

The aldehyde is reacted in liquid phase in an inert organic solvent in the presence of a catalytic amount of a compound selected from the group consisting of alkali metal hydrides, aluminum alkoxides and the Grignard reagent. Suitable organic solvents are those liquids wherein the epoxyaldehyde is soluble but with which it does not react. Examples of such solvents are such hydrocarbons as the aromatics, e.g., benzene, toluene, and the xylenes; the paraffins, such as pentane, hexane, octane and the like; the haloparaffins, such as chloroform, carbon tetrachloride, ethylene dichloride, trichloroethane and the like; and ethers, including diethyl ether and dioxane. Since the catalysts employed tend to be inactivated by the presence in the reaction system of more than a trace of water, the use of a substantially anhydrous liquid medium, i.e., containing less than about 1% w. of water, is preferred. Since in concentrated reaction systems there is noticeable production of high molecular weight by-products, it is preferred that the solvent be employed in molar excess, that is, with more than about one mole, and preferably from about two to twenty moles, of solvent per mole of epoxyaldehyde.

The catalysts employed are selected from the group consisting of alkali metal hydrides, aluminum alkoxides and Grignard reagents. By alkali metal hydrides are meant those hydrides having the structure MH where M is the cation of an alkali metal. Preferred hydrides are sodium hydride and potassium hydride, both of which are somewhat more reactive under the conditions of the reaction than lithium hydride.

That the alkali metal hydrides are effective catalysts for the ester-forming reaction of epoxyaldehydes is surprising. Under similar conditions, no yield of ester is obtained when saturated aliphatic aldehydes, such as propionaldehyde, are treated with sodium hydride. In view of the known tendency of the alkali metal borohydrides to reduce epoxyaldehydes to epoxy alcohols, it would be expected that the metal hydrides would bring about a corresponding reduction.

Of the alkoxides, the preferred compounds are those having less than four carbon atoms, e.g., aluminum ethoxide, aluminum propoxide and aluminum butoxide, and of these lower alkoxides the most reactive and therefore the most preferred is aluminum isopropoxide. The Grignard reagent is that hydrocarbon magnesium halide compound having the formula R'MgX where R' is hydrocarbon, preferably alkyl of up to four carbon atoms, and X is halogen, e.g., chlorine, bromine or iodine. Representative Grignard reagents which are catalytically active in the process of the invention are the aryl magnesium halides, e.g., phenyl magnesium bromide; and the alkyl magnesium halides, e.g., ethyl magnesium iodide, propyl magnesium chloride, and methyl magnesium bromide.

Only a catalytic amount of any of the types of compounds noted is required to bring about the reaction described. Amounts of catalyst below about 15% w., based on the epoxyaldehyde, are sufficient, and in general amounts of catalyst on the order of about 0.1% w. to about 5% on the same basis are sufficient. The catalyst may be soluble, as in the case of the aluminum alkoxides, or insoluble, as in the case of the metal hydrides.

It has been found that where the epoxyaldehyde dismutation reaction of the invention is impractically slow the rate may be materially increased by including in the reaction system an amount of miscible alcohol equivalent to that of the catalyst. For example, although the sodium hydride-catalyzed reaction of alpha-methyl-alpha,beta-epoxypropanal to yield alpha-methyl-alpha,beta-epoxypropyl alphamethyl-alpha,beta-epoxypropionate is very slow, good ester yields were obtained after 16 hours when a catalytic amount of butanol, glycidol or benzyl alcohol were included in the reaction system. Suitable alcohols are those having the structure R"OH, where R" is a hydrocarbyl or epoxyhydrocarbyl radical, and which are miscible with the reaction system. Exemplary hydroxy compounds include the alkanols, e.g., ethanol, propanol, butanol, pentanol and preferably those having up to 8 carbon atoms.

The above reaction may be conducted at comparatively low temperatures. While temperatures from about 0° C. to reflux temperatures may be employed, excellent results are obtained when conducting the reaction at or near room temperature, i.e., between about 20° C. and about 50° C., temperatures between about 20° C. and 35° C. being most preferred.

The epoxy esters prepared as above may be separated from the reaction system during the reaction, or after its termination by conventional methods, e.g., distillation, preferably under reduced pressure; extraction; crystallization, or the like. The recovered products are generally clear high-boiling liquids at room temperature.

The preparation of the esters by the above mentioned is illustrated by the following procedure for making glycidyl glycidate:

GLYCIDYL GLYCIDATE

A dry solution of 72 g. (1.0 mole) of glycidaldehyde in 150 ml. of carbon tetrachloride was treated with a solution of 0.03 mole of aluminum isopropoxide in 25 ml. of benzene. The mildly exothermic reaction was moderated by periodic cooling to maintain a maximum temperature of 35° C. After two hours, no further cooling was necessary and another portion of catalyst was added. The mixture warmed by itself again for 15 minutes and was then no longer exothermic. After one hour longer there was added a solution of 12 g. of tartaric acid in 85 ml. of water. After shaking, about 200 ml. of ether was added and shaking was continued for a short time. The ether layer, after drying over magnesium sulfate, was concentrated on the steam bath to a low volume. Claisen distillation of the residue afforded 5.1 g. of precut, B.P. 30–65° C. (<1 mm.) and 10.0 g. (14% yield based on glycidaldehyde) of product, B.P. 65° C. (<1 mm.); $n_D^{20}$ 1.4541. Bottoms amounted to 8 g. The product obtained in this manner was analyzed and the following data obtained:

| | Percent w. | | Epoxide Value Eq./100 g. | Ester Value Eq./100 g. |
|---|---|---|---|---|
| | C | H | | |
| Calculated for $C_6H_8O_4$ | 50.0 | 5.6 | 1.38 | 0.70 |
| Found | 49.6 | 50.8 | 1.23 | 0.74 |

The product was thus identified as glycidyl glycidate.

The polyether polyepoxides to be used in preparing the compositions of the present invention include those compounds possessing at least two ether linkages (i.e., —O— linkages) and a plurality of 1,2-epoxy groups (i.e.,

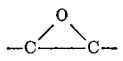

groups). These polyether polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be nonomeric or polymeric.

For clarity, many of the polyether polyepoxides and particularly those of the polymeric type will be described throughout the specification and claims in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The expoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyether polyepoxide material consists of a single compound and all of the epoxy groups are intact, the epoxy equivalency will be integers, such as 2, 3, 4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5 and the like.

Polyether polyepoxides to be used in the process of the invention may be exemplified by 1,4-bis(2,3-epoxypropoxy)benzene, 1,3-bis(2,3-epoxypropoxy)benzene, 4,4'-bis(2,3-epoxyproxy)diphenyl ether, 1,4-bis(2,3-epoxypropoxy)oxtane, 1,4-bis(2,3-epoxypropoxy)cyclohexane, 4,4'-bis(2 - hydroxy - 3,4 - epoxybutoxy)diphenyldimethylmethane, 1,3-bis(4,5-epoxypentoxy)-5-chlorobenzene, 1,4-bis(3,4 - epoxybutoxy) - 2 - chlorocyclohexane, diglycidyl ether, ethylene glycol diglycidyl ether, resorcinol diglycidyl ether, and 1,2,3,4-tetra(2-hydroxy-3,4-epoxybutoxy)butane.

Other examples include the glycidyl polyether of polyhydric phenols obtained by reacting a polyhydric phenol with an excess, e.g., 4 to 8 mol excess, of a chlorohydrin, such as epichlorohydrin and dichlorohydrin. Thus, polyether B described hereinafter, which is substantially 2,2-bis(2,3-epoxypropoxyphenyl)propane, is obtained by reacting bis-phenol(2,2-bis(hydroxyphenyl)propane) with an excess of epichlorohydrin in an alkaline medium. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxybenzophenone, bis(4-hydroxyphenyl)ethane, and 1,5-dihydronaphthalene.

Still a further group of the polyether polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. Polyhydric alcohols that may be used for this purpose include glycerol, propylene glycol, ethylene glycol, diethylene glycol, butylene glycol, hexanetriol, sorbitol, mannitol, pentanetroil, pentaerythritol, di- and tri-pentaerythritol, polyglycerol, dulcitol, inositol, carbohydrates, methyltrimethylolpropane, 2,6-octanedoil, 1,2,4,5-tetrahydroxycyclohexane, 2-ethylhexanetroil-1,2,6, glycerol methyl ether, glycerol allyl ether, polyvinyl alcohol and polyally alcohol and mixtures thereof.

Other poyether polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl)ether, the reaction product of resorcinol and bis(2,3-epoxypropyl)ether, and the reaction product of catechol and bis(2,3-epoxypropyl)ether.

A group of polymeric-type polyether polyepoxides comprises the hydroxy-substituted polyepoxy polyethers obtained by reacting, preferably in an alkaline medium, a slight excess, e.g., .5 to 3 mol excess, of a halogen-containing epoxide, such as epichlorohydrin, with any of the aforedescribed polyhydric phenols, such as resorcinol, catechol, 2,2 - bis(4' - hydroxyphenyl)propane, bis(4 - (2' - hydroxynaphth - 1-yl)2,2-hydroxynaphth-1-yl)methane and the like.

Other polymeric polyether polyepoxides include the polymers and copolymers of the allylic ether of epoxy-containing alcohols. When this type of monomer is polymerized in the substantial absence af alkaline or acidic catalysts, such as in the presence of heat, oxygen, peroxy compounds, actinic light, and the like, they undergo additional polymerization at the multiple bond leaving the epoxy group unaffected. These allylic ethers may be polymerized with themselves or with other ethylinically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, 2-chloroallyl acetate, and vinyl methallyl pimelate. Illustrative examples of these polymers include poly(allyl 2,3-epoxypropyl ether), allyl 2,3-epoxypropyl ether-styrene copolymer, methallyl 3,4-epoxybutyl ether-allyl benzoate copolymer, poly(vinyl 2,3-epoxypropyl) ether and an allyl glycidyl ether-vinyl acetate copolymer.

Preferred polyether polyepoxides comprise the members of the group consisting of diglycidyl ether, monomeric aliphatic polyepoxides containing a plurality of glycidyl radicals joined through oxygen ether linkages to aliphatic hydrocarbon radicals, monomeric aromatic polyepoxides containing a plurality of glycidyl radicals joined through oxygen ether linkages to mononuclear or polynuclear aromatic radicals, the polyepoxy-containing reaction product of an aliphatic polyhydric alcohol and epichlorohydrin, the polyepoxy-containing polymeric reaction product of an aromatic polyhydric phenol and epichlorohydrin, the polyepoxy-containing reaction product of an aliphatic polyhydric alcohol and a polyepoxide compound, the polyepoxy-containing reaction product of a polyhydric phenol and a polyhydric phenol and a polyepoxide compound, the homo- and copolymers of allylic ethers of epoxy-substituted alcohols prepared in the absence of alkaline or acidic catalysts, and copolymers of the aforedescribed epoxy-containing monomers and at least one monomer containing a $CH_2=C=$ group prepared in the absence of alkaline or acidic catalysts.

Preferred polyether polyepoxides include the monomeric and polymeric glycidyl ether of dihydric phenols obtained by reacting epichlorohydrin with a dihydric phenol in an alkaline medium. The monomeric products of this type may be represented by the general formula

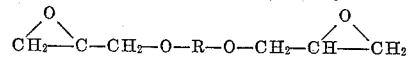

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value of $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of the dihydric phenols will be illustrated below.

PREPARATION OF GLYCIDYL POLYETHERS OF DIHYDRIC PHENOLS

Polyether A

About 2 mols of bis-phenol was dissolved in 10 mols of epichlorohydrin and 1 to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75. For convenience, this product will be referred to hereinafter as polyether A.

Polyether B

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' mercury method and a molecular weight of 483. The product had an epoxy value of 0.40 eq./100 g., and an epoxy equivalency of 1.9. For convenience, this product will be referred to as polyether B.

Particularly preferred members of the above-described group are the glycidyl polyethers of the dihydric phenols, and especially 2,2'-bis(4'-hydroxyphenyl)propane, having an epoxy equivalency between 1.1 and 2.0 and a molecular weight between 300 and 900. Particularly preferred are those having a Durran's mercury method softening point below about 60° C.

The glycidyl polyethers of polyhydric phenols obtained by condensing the polyhydric phenols with epichlorohydrin are also referred to as "ethoxylene" resins. See Chemical Week, vol. 69, page 27, for September 8, 1951.

Of particular value in the process of the invention are the polyepoxides containing only carbon, hydrogen, oxygen and halogen atoms.

The compositions of the invention may be prepared by any suitable method. If both of the two components are liquids, the compositions may be simply prepared by mixing the two together. If the polyether polyepoxide is a thick liquid or solid, it is generally preferred to heat the hard material before or during the mixing. Various solvents or diluents which will evaporate before or during cure may be added to assist in the preparation, but the addition of these materials is not generally desirable as it usually lengthens the time of cure of the finished product. Suitable solvents include hydrocarbons, such as xylene, benzene, petroleum distillates and the like. Monoglycidyl compounds and nitrile may also be employed.

The ratio of the polyether polyepoxide and the epoxy ester in the composition will vary within certain limits depending upon the properties desired in the resulting products. Compositions having desired properties are obtained when the epoxy ester makes up at least 1% by weight of the mixture, and preferably 5% to 8% by weight of the mixture. Particularly good results are obtained when the epoxy ester makes up from 10% to 50% and the polyether polyepoxide makes up from 90% to 50% by weight of the combined mixture.

Other materials, such as fillers, dyes, plasticizer, stabilizers and the like may be added as desired along with suitable other resinous materials, such as vinyl resins, tars, pitches, distillates, oils, alkyd resins and the like.

The compositions of the invention may be cured by the action of a curing or hardening agent. For this purpose, epoxy curing agents, which may be acidic, neutral or alkaline, are added. Examples of the curing agents include, among others, alkalies like sodium or potassium hydroxide: alkali phenoxides like sodium phenoxide; carboxylic acids or anhydrides, such as phthalic anhydride, teterahydrophthalic anhydride; dimer or trimer acids derived from unsaturated fatty acids, 1,20-eicosanedioic acid, and the like. Friedel-Crafts metal halides, such as aluminum chloride, zinc chloride, ferric chloride; salts such as zinc fluoborate, magnesium perchlorate, zinc fluosilicate; phosphoric acid and partial esters thereof including n-butyl ortho-phosphate, diethyl ortho-phosphate and hexaethyltetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N,N-diethyl-1,3-propane diamine, 1,2-diamino-2-methyl-propane, 2,3-diamino-2-methylbutane, 2,4-diamino-2-methylpentane, 2,4-diamino-2,6-diethyl-octane, dibutylamine, dioctylamine, dionylamine, distearylamine, diallylamine, dicyclohexylamine, methylethylamine, ethylcyclohexylamine, pyrrolidine, 2-methylpyrrolidine, tetrahydropyridine, 2,6-diaminopyridine, meta-phenylene diamine, and the like, and soluble adducts of amines and polyepoxides and their salts, such as described in U.S. 2,651,589 and in U.S. 2,640,037. Also included are the amino-amides obtained by reacting polybasic acids with polyamines.

Preferred curing agents are the polycarboxylic acids and their anhydrides, the primary and secondary aliphatic, cycloaliphatic, aromatic and heterocyclic amines, and preferably the polyamines and adducts of amines and epoxides.

The amount of the curing agent employed will vary depending upon the type of agent selected. In general, the amount of the curing agent will vary from about 0.5% to 200% by weight of the combined mixture of epoxy ether and epoxy ester. The tertiary amines and $BF_3$ complexes are preferably employed in amounts varying from about 0.5% to 20% and the metal salts are preferably employed in amounts varying about 1% to 15%. The secondary and primary amines, acids and anhydrides are preferably employed in at least .6 equivalent, an equivalent amount being that sufficient to furnish one active hydrogen atom or carboxyl group or anhydride group for every epoxy group. Such combinations are preferably combined in equivalent ratios (curing agent to epoxy) which vary from about .6:1 to 1.5:1.

The curing of the above-described compositions to form the desired insoluble infusible products may be accomplished by merely mixing the above-noted curing agents in the desired amounts with the compositions of the present invention. The most active curing agents, such as the polyamines as diethylene triamine, are reactive at room temperature and application of heat is not necessary to effect the cure. Other agents, such as the aromatic polyamines are not quite as active at the lower temperatures and it is desirable to apply heat to speed cure. Temperatures employed will vary from about 30° C. to as high or higher than 250° C.

The compositions of the invention may be utilized for a variety of applications, because of their excellent fluidity and improved properties, the compositions are ideally suited for use in preparing coating compositions, impregnating and sealing compositions, foams, pottings, castings, adhesives and the like.

When used for coating compositions, the new compositions of the invention may be used as such or mixed with various additives, such as plasticizers, stabilizers and extenders such as oils, resins, tars, pitches, distillates and the like, and then combined with the desired curing agent. The coatings prepared in this manner may be allowed to set hard at room temperature or heat may be applied to hasten the cure.

The products of the invention may also be used in preparing pottings and castings for electrical apparatus. In actual practice, the compositions are generally combined with the desired curing agent and the mixture poured into the mold or casting containing the electrical apparatus, such as electrical motors and the like, and the mixture allowed to set. Heat may also be applied to hasten cure.

The resinous products may also be employed to prepare valuable foamed products. In this application the resinous products of the invention are preferably combined with the desired curing agents and foaming agents and others, such as thixotropic agents, pigments, stabilizing agents and the like that may be desired. This mixture may be foamed and cured by allowing to stand or by applying heat.

The products of the invention may also be employed to employ valuable adhesives and impregnating compositions. In utilizing the products for these applications it is generally desirable to combine them with the desired curing agent and any suitable diluent such as acrylonitrile, acetonitrile, crotonitrile, and desired fillers and stabilizers and then apply this mixture to the desired surface. Adhesive compositions prepared in this manner may be used to unite various surfaces such as wood-to-wood, metal-to-metal, resins-to-resins and the like. The adhesives may be allowed to set at room temperature or heat may be applied to hasten the cure.

To illustrate the manner in which the invention may be carried out, the following examples are given. It is understood, however, that the examples are for the purpose of illustration and the invention is not to be regarded as limited to any of the specific conditions cited therein.

EXAMPLE I

This example illustrates the excellent low viscosities of the new compositions of the present invention.

A series of compositions were prepared by mixing various amounts of glycidyl glycidate prepared as shown above to polyether A prepared as shown above. The viscosities of the mixtures were determined. As shown in the following table; the use of a relatively small amount of the glycidyl glycidate brings about a very effective reduction in the viscosity of the combined mixture:

| Percent glycidyl glycidate: | Viscosities at 25° C., poises |
|---|---|
| 5 | 79 |
| 10 | 37 |
| 15 | 17 |
| 20 | 8 |
| 25 | 6 |

The resulting compositions are heated with an equivalent amount of ethylene diamine at 100° C. The resulting products are hard, insoluble, infusible products.

EXAMPLE II

This example illustrates the superior properties possessed by the cured compositions of the invention as compared to cured products obtained from conventional compositions containing conventional diluents.

Polyether A was combined with glycidyl glycidate in the proportions shown in the table below. This composition was then combined with 15 parts (per 100 parts of the composition) of meta-phenylene diamine and the mixture heated at 150° C. for 4 hours. The resulting products were hard, insoluble, infusible products. The heat distortion temperature was then determined. This is shown in the table below in comparison to the heat distortion temperatures of compositions containing polyether A and n-butyl glycidyl ether and a composition containing polyether A and epoxidized dicyclopentenyl ether.

| Composition: | Heat distortion temperature |
|---|---|
| 80% polyether A–20% glycidyl glycidate | 154 |
| 89% polyether A–11% butyl glycidyl ether | 101 |
| 62% polyether A–38% diepoxide of dicyclopentenyl ether | 128 |

It is evident from the above that the new compositions have heat distortion temperatures far above the conventional compositions.

EXAMPLE III

Example II was repeated with the exception that the compositions were heated at 150° C. for 20 hours. The heat distortion temperatures for the compositions are shown below.

| Composition: | Heat distortion temperature |
|---|---|
| 80% polyether A–20% glycidyl glycidate | 158 |
| 89% polyether A–11% butyl glycidyl ether | 105 |

EXAMPLE IV 80 parts of polyether A was combined with 20 parts of glycidyl glycidate in the proportions shown in the table above. This composition was then combined with 15 parts (per 100 parts of the composition) of diethylene triamine and the mixture heated at 150° C. for 4 hours. The product is a hard, insoluble infusible product. The heat distortion point was 99 compared to a value of 74 for a composition of 89 parts polyether A and 11 parts of butyl glycidyl ether cured under the same conditions.

EXAMPLE V

A composition is prepared by mixing 50 parts of glycidyl glycidate with 100 parts of polyether B. The resulting fluid liquid mixture is then combined with an equivalent amount of diaminopyridine and the mixture heated at 150° C. for several hours. The resulting product is a hard, insoluble, infusible material having high heat distortion point.

The above is repeated with the exception that the diaminopyridine is replaced with each of the following: diaminodiphenylsulfone and N-aminoethylpiperazine. Related results are obtained.

EXAMPLE VI

A series of compositions are prepared by mixing polyether A with 5%, 10%, 20% and 25% by weight of 2,3-epoxy-2-methylbutyl 2,3-epoxy-2-methylbutyrate. The resulting solutions have low viscosities and could be easily poured or applied as a coating without the use of added solvents. The compositions can also be cured with an equivalent amount of diethylene triamine at 100° C. to form hard, insoluble, infusible products.

EXAMPLE VII 80 parts of polyether A is combined with 20 parts of glycidyl glycidate and the fluid mixture combined with an equivalent amount of hexahydrophthalic anhydride and 1% by weight of tri(dimethylaminomethyl)phenol. This mixture is heated at 150° C. for several hours. The resulting product is a hard, insoluble, infusible product which has a high heat distortion temperature.

Related results are obtained by replacing the hexahydrophthalic anhydride with equivalent amounts of each of the following: pyromellitic dianhydride, methyl Nadic anhydride, chlorendic anhydride and dichloromaleic anhydride.

EXAMPLE VIII

An adhesive composition is prepared by mixing the following components together: 75 parts of polyether A, 25 parts of glycidyl glycidate, 35 parts of asbestos and 8 parts of dicyandiamide. This fluid mixture was used as an adhesive for bonding aluminum plates to aluminum plates to aluminum plates. The bonded plates were pressed together at about 40 p.s.i. and cured at 400° F. for 40 minutes. The resulting bonds are very strong and have good resistance to heat.

EXAMPLE IX

Example VIII is repeated with the exception that polyether A is replaced by an equal amount of polyether B. Related results are obtained.

EXAMPLE X

A surface coating composition is prepared by mixing 70 parts of polyether A, 30 parts of glycidyl glycidate, titanium dioxide pigment and 15 parts of diethylene triamine. This fluid mixture can easily be spread out on tin panels and cured at 150° C. in 4 hours. The resulting coatings are very hard and tough and have good resistance to water, chemicals and to high temperatures.

EXAMPLE XI

Example V is repeated with the exception that the diaminopyridine is replaced with equivalent amounts of each of the following: xylenediamine, N-(2-hydroxypropyl)-ethylene diamine, methylene dianiline and mixtures of methylene dianiline and meta-phenylene diamine. Related results are obtained.

EXAMPLE XII

Examples I to V are repeated with the exception that the glycidyl glycidate is replaced with an equal amount of 3,4-epoxytetrahydropyranyl-3 3,4-epoxytetrahydropyran-3-carboxylate. Related results are obtained.

I claim as my invention:
1. A composition comprising (1) 99 parts to 30 parts by weight of a glycidyl polyether of a polyhydric compound of the group consisting of polyhydric phenols and polyhydric alcohols, and (2) 1 part to 70 parts by weight of glycidyl glycidate.
2. A composition as in claim 1 wherein the glycidyl polyether is a glycidyl polyether of 2,2-bis(4-hydroxyphenyl)propane having a molecular weight between 200 and 4,000.
3. A composition comprising (1) 99 parts to 50 parts by weight of a glycidyl polyether of a polyhydric phenol having a vic-epoxy equivalency greater than 1.0, and (2) 1 part to 50 parts by weight of glycidyl glycidate.
4. An insoluble infusible product obtained by heating the composition defined in claim 1 with an amine curing agent.
5. An insoluble infusible product obtained by heating the composition defined in claim 1 with a carboxylic acid anhydride curing agent.
6. An insoluble infusible product obtained by heating the composition defined in claim 3 with meta-phenylene diamine.
7. An insoluble infusible product obtained by heating the composition of claim 3 with diethylene triamine.
8. An insoluble infusible product obtained by heating the composition of claim 3 with tetrahydrophthalic acid anhydride.

References Cited by the Examiner
UNITED STATES PATENTS

| | | | |
|---|---|---|---|
| 2,682,514 | 6/1954 | Newey | 260—47 |
| 2,969,377 | 1/1961 | Phillips et al. | 260—2 |
| 3,136,788 | 6/1964 | Payne et al. | 260—47 |
| 3,154,504 | 10/1964 | Carey et al. | 260—30.4 |

OTHER REFERENCES

Lee et al.: "Epoxy Resins," McGraw-Hill Book Co., Inc., N.Y., July 7, 1957, page 142 particularly relied on. (Copy in S.L. TP986 E6L4.)

Lee et al.: "Epoxy Resins," MrGraw-Hill, N.Y. 1957. (Copy in Scientific Library.)

WILLIAM H. SHORT, *Primary Examiner.*

HAROLD N. BURSTEIN, T. D. KERWIN, P. H. HELLER, *Assistant Examiners.*